(12) United States Patent
Takai

(10) Patent No.: US 8,926,836 B2
(45) Date of Patent: Jan. 6, 2015

(54) RAINWATER FILTERING DEVICE FOR INFLOW PATH

(75) Inventor: Seiichiro Takai, Tokyo (JP)

(73) Assignee: Totetu Mfg. Co. Ltd., Tokyo (JP)

( * ) Notice: Subject to any disclaimer, the term of this patent is extended or adjusted under 35 U.S.C. 154(b) by 468 days.

(21) Appl. No.: 13/387,521

(22) PCT Filed: Oct. 29, 2009

(86) PCT No.: PCT/JP2009/068549
§ 371 (c)(1),
(2), (4) Date: Jan. 27, 2012

(87) PCT Pub. No.: WO2011/052054
PCT Pub. Date: May 5, 2011

(65) Prior Publication Data
US 2012/0118802 A1    May 17, 2012

(51) Int. Cl.
*B01D 35/02* (2006.01)
*E04D 13/08* (2006.01)
*E04D 13/076* (2006.01)
*E03B 3/03* (2006.01)
*E03F 5/10* (2006.01)

(52) U.S. Cl.
CPC ............... *E04D 13/08* (2013.01); *B01D 35/02* (2013.01); *E04D 13/076* (2013.01); *E03B 3/03* (2013.01); *E03F 5/105* (2013.01); *E04D 2013/086* (2013.01)
USPC ...... 210/162; 210/170.03; 210/236; 210/448; 210/461; 52/12; 52/16

(58) Field of Classification Search
CPC ... E04D 13/076; E04D 13/0767; E04D 13/08; E04D 2013/086; E03B 3/02; E03B 3/03; E03F 1/00; E03F 5/10; E03F 5/105; B01D 23/04; B01D 29/117; B01D 35/02; B01D 2221/12

USPC ............ 210/162, 170.03, 236, 448, 452, 459, 210/461, 463, 473, 474, 477; 52/12, 16
See application file for complete search history.

(56) References Cited

U.S. PATENT DOCUMENTS 2,201,849 A * 5/1940 Cotterman .................... 210/452
2,446,256 A * 8/1948 Young ........................... 210/448
(Continued)

FOREIGN PATENT DOCUMENTS

CN    1884727    12/2006
CN    101065544    10/2007
(Continued)

OTHER PUBLICATIONS

Chinese Official Action, mail date is May 23, 2013 and English language translation thereof.

(Continued)

*Primary Examiner* — Christopher Upton
(74) *Attorney, Agent, or Firm* — Greenblum & Bernstein, P.L.C.

(57) ABSTRACT

Collected rainwater is led to a rainwater containing section by an inflow path. A water-permeable tube body extends vertically in the middle of a vertical pipe located immediately before a position at which the rainwater flows into the rainwater containing section. A bag-like filter having an open upper end and a closed lower end is contained in the tube body or covers an outer side of the tube body, and the bag-like filter captures dust in the rainwater while allowing the rainwater to pass through the bag-like filter. A mounting and dismounting means is provided to the vertical tube in order to dismount the tube body and the filter from the vertical pipe and to mount the tube body and the filter to the vertical pipe.

11 Claims, 11 Drawing Sheets

(56) References Cited

U.S. PATENT DOCUMENTS

| | | | | |
|---|---|---|---|---|
| 2,669,358 A | * | 2/1954 | Young | 210/448 |
| 3,628,668 A | * | 12/1971 | Huppert | 52/12 |
| 4,419,232 A | * | 12/1983 | Arntyr et al. | 210/170.03 |
| 4,798,028 A | * | 1/1989 | Pinion | 52/16 |
| 5,452,546 A | * | 9/1995 | Goddard | 52/12 |
| 5,681,455 A | * | 10/1997 | Takai et al. | 210/162 |
| 5,985,158 A | * | 11/1999 | Tiderington | 52/12 |
| 7,775,232 B2 | * | 8/2010 | Takai | 52/16 |
| 2010/0116358 A1 | * | 5/2010 | Takai | 210/170.03 |

FOREIGN PATENT DOCUMENTS

| | | |
|---|---|---|
| CN | 201221103 | 4/2009 |
| DE | 202008004861 | 9/2009 |
| JP | 62-185777 | 11/1987 |
| JP | 5-81388 | 11/1993 |
| JP | 9-78639 | 3/1997 |
| JP | 2003-13488 | 1/2003 |
| TW | 468658 | 12/2001 |
| TW | M287830 | 2/2006 |

OTHER PUBLICATIONS

International Preliminary Report on Patentability and English Translation, dated Jun. 21, 2012.

Korea Office action, dated Mar. 26, 2013 along with an english translation thereof.

Taiwan Office action, dated Mar. 29, 2013 along with an english translation thereof.

China Office action, dated 09/27/213 along with an english translation thereof.

* cited by examiner

Fig. 2
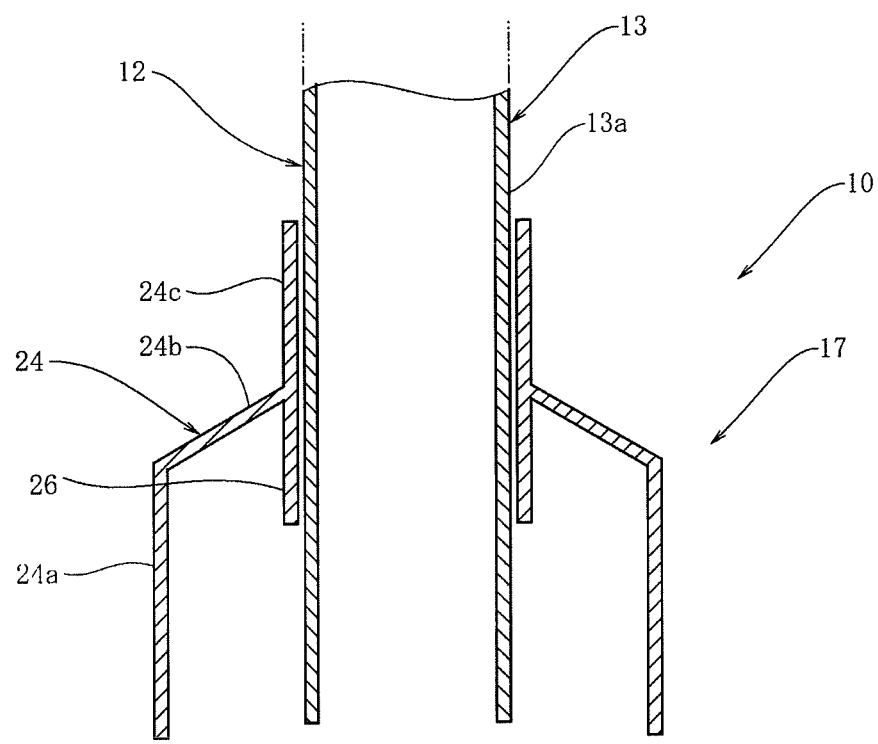
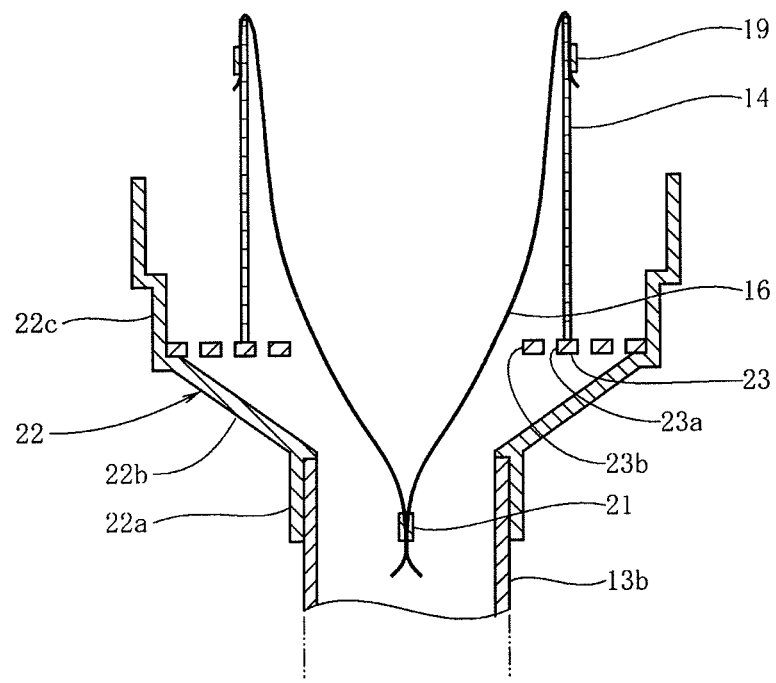

US 8,926,836 B2

RAINWATER FILTERING DEVICE FOR INFLOW PATH

TECHNICAL FIELD

The present invention relates to a device that eventually removes fine dust in rainwater by filtering the rainwater in an inflow path immediately before the rainwater flows into a rainwater containing section when collecting the rainwater that flows down in a gutter in a structure such as a house or a building or the rainwater that falls onto the ground and flows down in a lateral groove or the like and storing it in the rainwater containing section.

BACKGROUND ART

As this type of rainwater filtering device, there has been conventionally disclosed a rainwater inlet equipped with a filtering device in which a piping unit formed by combining a plurality of pipe connection members and a filtration bag attached and fixed to a connection of this piping unit are arranged in the rainwater inlet formed of a container frame (see, e.g., Patent Document 1). This rainwater inlet equipped with a filtering device has a configuration that rainwater flows in from one connection of the pipe connection member connected to a drainspout and is discharged from a connection of the pipe connection member fixed to a bottom of the rainwater inlet. Further, two connections having a difference in height are provided to the piping unit, and filtration bags are attached and fixed to these connections, respectively.

In the thus configured rainwater inlet equipped with the filtration bags, since the rainwater flows into the upper filtration bag even if the lower filtration bag is clogged, a probability is relatively low that all flow channels are closed even though the rainwater inlet is installed in an arboreous place or a typhoon comes. As a result, not only wastes in initial rainwater can be removed, the wastes in the rainwater can be always filtered by a filtering material without being dependent on types or shapes of wastes or conditions at the time of rainfall.

PRIOR ART DOCUMENT

Patent Document

Patent Document 1: Japanese Unexamined Patent Application Publication No. 2003-13488 (claim 1, paragraph [0007], paragraphs [0010] to [0012], FIG. 1, FIG. 2)

DISCLOSURE OF INVENTION

Problem to be Solved by the Invention

However, in the rainwater inlet equipped with a filtering device disclosed in Patent Document 1 according to the conventional technology, when the rainfall repeatedly occurs over a relatively long period of time, the filtration bags are gradually clogged to lose water permeability, thereby resulting in a problem that water overflows from the upper drainspout or the inlet and the rainwater cannot be smoothly collected, for example. Further, in the rainwater inlet equipped with a filtering device disclosed in Patent Document 1 according to the conventional technology, since the rainwater inlet is formed into a rectangular parallelepiped box-like shape hermetically closed by a container frame to prevent the inner rainwater from leaking and the filtration bag is disposed to the pipe connection member placed in the rainwater inlet in the piping unit fixed to the drainspout, the filtration bag must be removed from the pipe connection member of the piping unit in the rainwater inlet after, e.g., removing an upper wall of the rainwater inlet using a tool when the filtration bag is clogged, and hence there occurs a trouble that cleaning or replacement of the filtration bags require many processing steps. Furthermore, in the rainwater inlet equipped with a filtering device disclosed in Patent Document 1 according to the conventional technology, because the relatively large rainwater inlet having the piping unit and the filtration bags contained therein is installed in the drainspout, there is a problem that a relatively large installation space must be assured.

It is an object of the present invention to provide a rainwater filtering device for an inflow path, so that the rainwater filtering device always maintain the rainwater collecting performance of a specific level without impairing largely rainwater flow-down capability of the inflow path even if a filter is clogged to reduce water permeability or an amount of rainwater exceeds a capacity of filtration of the filter. It is another object of the present invention to provide a rainwater filtering device for an inflow path that a filter contained in a vertical pipe or a vertical inlet can be very easily cleaned or replaced when water permeability of the filter is considerably reduced because of rainfall repeated over a long period of time. It is still another object of the present invention to provide a rainwater filtering device for an inflow path that relatively slightly increasing an installation space can suffice or the installation space does not have to be increased at all.

Means for Solving Problems

As shown in FIG. 1 to FIG. 4, according to a first aspect of the present invention, there is provided a rainwater filtering device for an inflow path, comprising: an inflow path 12 through which collected rainwater is led to a rainwater containing section 11; a water permeable tube body 14 provided in a vertically extending manner in the middle of a vertical pipe 13 or a vertical inlet located immediately before a position at which the rainwater flows into the rainwater containing section 11 in the inflow path 12; a bag-like filter 16 that has an open upper end and a closed lower end, is contained in the tube body 14 or covers the outer side of the tube body 14, and captures dust in the rainwater while allowing the rainwater to pass therethrough; and mounting and dismounting means 17 provided to the vertical pipe 13 or the vertical inlet in order to dismount the tube body 14 and the filter 16 which are provided to the vertical pipe 13 or the vertical inlet from the vertical pipe 13 or the vertical inlet and to mount the same to the vertical pipe 13 or the vertical inlet, wherein the mounting and dismounting means 17 has a rainwater guide pipe 26 or a cylindrical rainwater guide member that is detachably inserted with a gap into an upper part of the tube body 14, and a ring-like path 30 surrounded by an inner peripheral surface of the tube body 14 and an outer peripheral surface of the rainwater guide pipe 26 or the rainwater guide member is configured so that the amount of rainwater permitted to pass through the lateral cross-sectional area of the ring-like path 30 corresponds to the maximum amount of rainwater which passes through the inflow path 12.

Further, as shown in FIG. 1 to FIG. 4, according to a second aspect of the present invention, there is provided an invention based on the first aspect characterized in that the vertical pipe 13 is constituted of an upper vertical pipe 13a and a lower vertical pipe 13b, and the mounting and dismounting means 17 is provided between the upper vertical pipe 13a and the lower vertical pipe 13b, the mounting and dismounting means 17 has: a funnel-shaped fixed pipe 22 that has a lower end connected to an upper end of the lower vertical pipe 13b and an upper end formed to have a larger diameter than the lower vertical pipe 13b and constitutes a part of the vertical pipe 13; a water permeable plate 23 which is provided in the fixed pipe 22 and on which the tube body 14 is placed; a movable pipe 24 that has a lower end detachably inserted with a gap into an upper part of the fixed pipe 22 and an upper end freely fitted on a lower end of the upper vertical pipe 13a and constitutes a part of the vertical pipe 13; and the rainwater guide pipe 26 that is provided integrally with the movable pipe 24, detachably inserted with a gap into the upper part of the tube body 14 on the water permeable plate 23, and configured to be freely fitted on the upper vertical pipe 13a, and the tube body 14 and the filter 16 are configured to be capable of being taken out from the fixed pipe 22 by pulling up the movable pipe 24 together with the rainwater guide pipe 26 along the upper vertical pipe 13a and to be capable of being contained in the fixed pipe 22.

Furthermore, as shown in FIG. 7 to FIG. 10, according to a third aspect of the present invention, there is provided an invention based on the first aspect characterized in that the inflow path 52 has: a horizontal pipe 53 that is extended in the horizontal direction and buried in the ground; a bottomed upper inlet 54 that is buried to expose an upper end thereof on the ground surface and has the horizontal pipe 53 connected thereto; and a cylindrical vertical inlet 56 that has an upper part connected to a bottom portion of the upper inlet 54 and allows the rainwater 55 supplied from the horizontal pipe 53 to flow down from an upper end opening portion 56a and to be thereby fed to the rainwater containing section 51, the mounting and dismounting means 64 has: a water permeable plate 66 or a bottom plate which is secured to an intermediate inner surface or a lower end of the vertical inlet 56 and on which the tube body 62 is placed; a ring-like receiving member 67 secured to an inner surface of the vertical inlet 56 so as to be placed above the upper end of the tube body 62 placed on the water permeable plate 66 or the bottom plate; and the cylindrical rainwater guide member 68 that has an upper end placed on the receiving member 67 and a lower end movably inserted into the upper part of the tube body 62, and an inside diameter of the receiving member 67 is formed to be larger than an outside diameter of the tube body 62, and the tube body 62 and the filter 63 are configured to be capable of being taken out from the vertical inlet 56 by removing the rainwater guide member 68 from the vertical inlet 56 and to be capable of being contained in the vertical inlet 56.

Moreover, as shown in FIG. 1, according to a fourth aspect of the present invention, there is provided an invention based on the first to third aspects characterized in that the water permeable tube body 14 is formed of a porous material, a perforated member, a hard net, or a slit member.

Additionally, as shown in FIG. 1, according to a fifth aspect of the present invention, there is provided an invention based on the first to third aspects characterized in that the filter 16 is formed into a cylindrical shape, and a lower end of the filter 16 is closed by a lower band 21 in an openable manner.

Effect of the Invention

In the rainwater filtering device according to the first aspect of the present invention, since the ring-like path is configured so that the amount of rainwater permitted to pass through the lateral cross-sectional area of the ring-like path surrounded by the inner peripheral surface of the tube body and the outer peripheral surface of the rainwater guide tube or the rainwater guide member corresponds to the maximum amount of rainwater which passes through the inflow path, a situation that the rainwater overflows from the gutter or the like above the inflow path can be avoided even in case that a large amount of rainwater flows down because of heavy rainfall and a part of the rainwater can be filtered but the remaining rainwater cannot be filtered. That is, when an amount of rainfall is considerably large, since the water overflows from the ring-like path to be led to the rainwater containing section, the rainwater flow-down performance can be always maintained. Further, even if the rainwater overflows from the ring-like path because of the heavy rainfall in this manner, a major part of dust is captured by the filter in the early stages of rainfall, the rainwater is greatly clean at the time of regular rainfall, and hence water quality of the rainwater stored in the rainwater containing section is hardly affected. Moreover, even if the filter is clogged to reduce the water permeability, the rainwater flow-down capability of the inflow path is not impaired largely, and the rainwater collecting performance can be always maintained at a specific level. It is to be noted that, when the filter is clogged, the tube body and the filter are dismounted from the vertical pipe or the like by the mounting and dismounting means to be cleaned or replaced, and then the tube body with the filter is mounted to the vertical pipe or the like by the mounting and dismounting means. In this manner, when the filter is clogged, the filter contained in the vertical pipe or the like can be very easily cleaned or replaced.

As compared with the conventional rainwater inlet equipped with a filtering device that requires to assure a large installation space in order to install in the drainspout the relatively large rainwater inlet having the piping unit and the filtration bags contained therein, in the rainwater filtering device according to the second aspect of the present invention, relatively slightly increasing the installation space can suffice since the diameters of the fixed pipe and the movable pipe are just increased to be larger than the diameter of the vertical pipe so that the tube body and the filter can be contained and a predetermined flow volume of rainwater can be assured.

As compared with the conventional rainwater inlet equipped with a filtering device that requires to assure the large installation space in order to install in the drainspout the relatively large rainwater inlet having the piping unit and the filtration bags contained therein, in the rainwater filtering device according to the third aspect of the present invention, since the tube body and the filter can be contained in the existing vertical pipe, the installation space does not have to be increased at all.

In the rainwater filtering device according to the fourth aspect of the present invention, since the tube body is formed of the porous material, the perforated member, the hard net, or the slit member, the tube body having the water permeability can be relatively easily obtained.

In the rainwater filtering device according to the fifth aspect of the present invention, since the filter is formed into the tube body and the lower end of the filter is closed by the lower band so as to be openable, the filter does not have to be replaced over a long period of time before durability of the filter reaches its limit, and filtration performance can be readily restored by removing the lower band and cleaning the filter together with the tube body.

BRIEF DESCRIPTION OF DRAWINGS

FIG. 2 is a cross-sectional view showing a state that a movable pipe of the rainwater filtering device is pulled up together with a rainwater guide pipe, which is associated with FIG. 1;

BEST MODE(S) FOR CARRYING OUT THE INVENTION

Modes for carrying out the present invention will now be described with reference to the drawings.

First Embodiment

Figure 1:
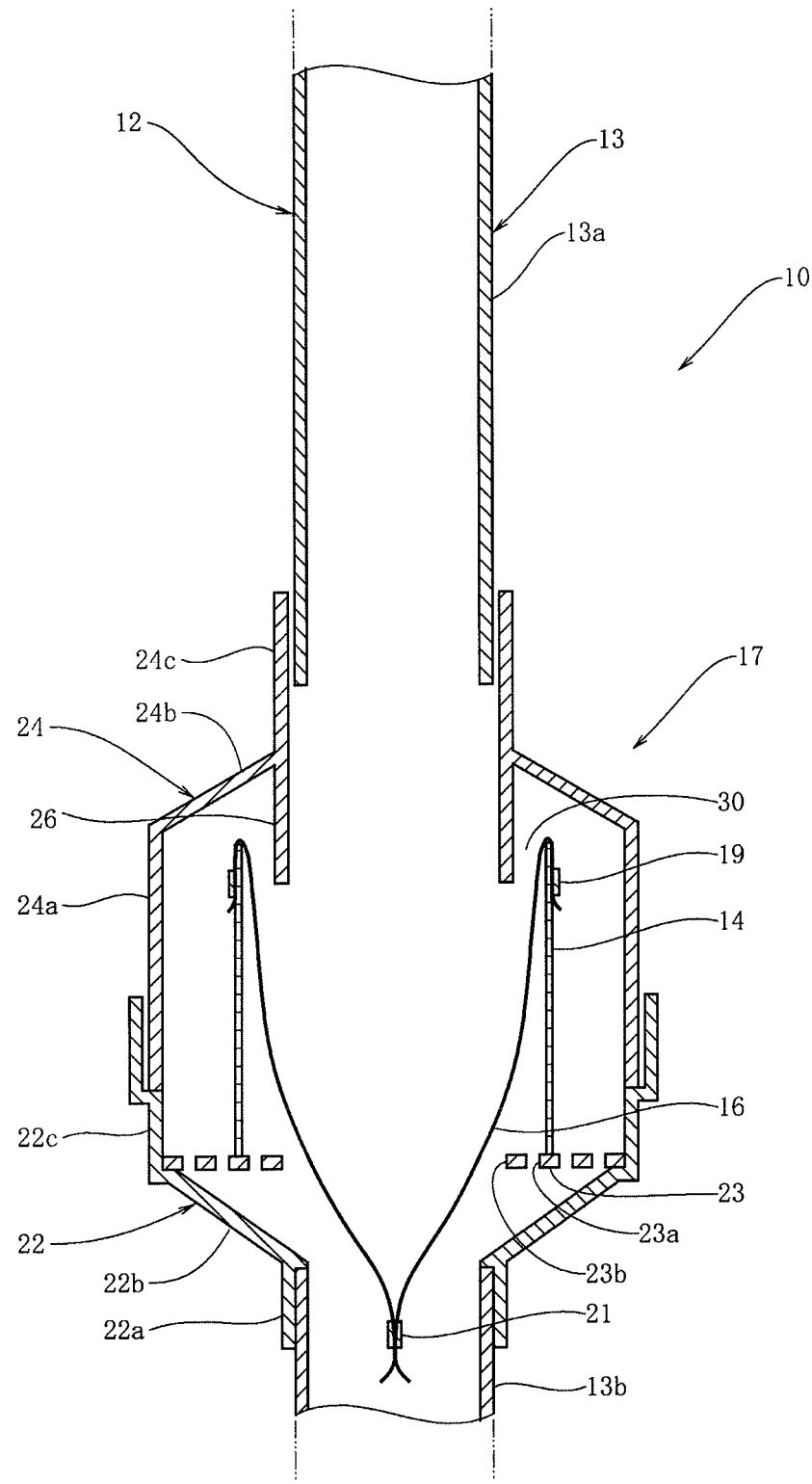
FIG. 1 is an enlarged longitudinal cross-sectional view of a part A in FIG. 4 showing a rainwater filtering device according to a first embodiment of the present invention.
Figure 4:
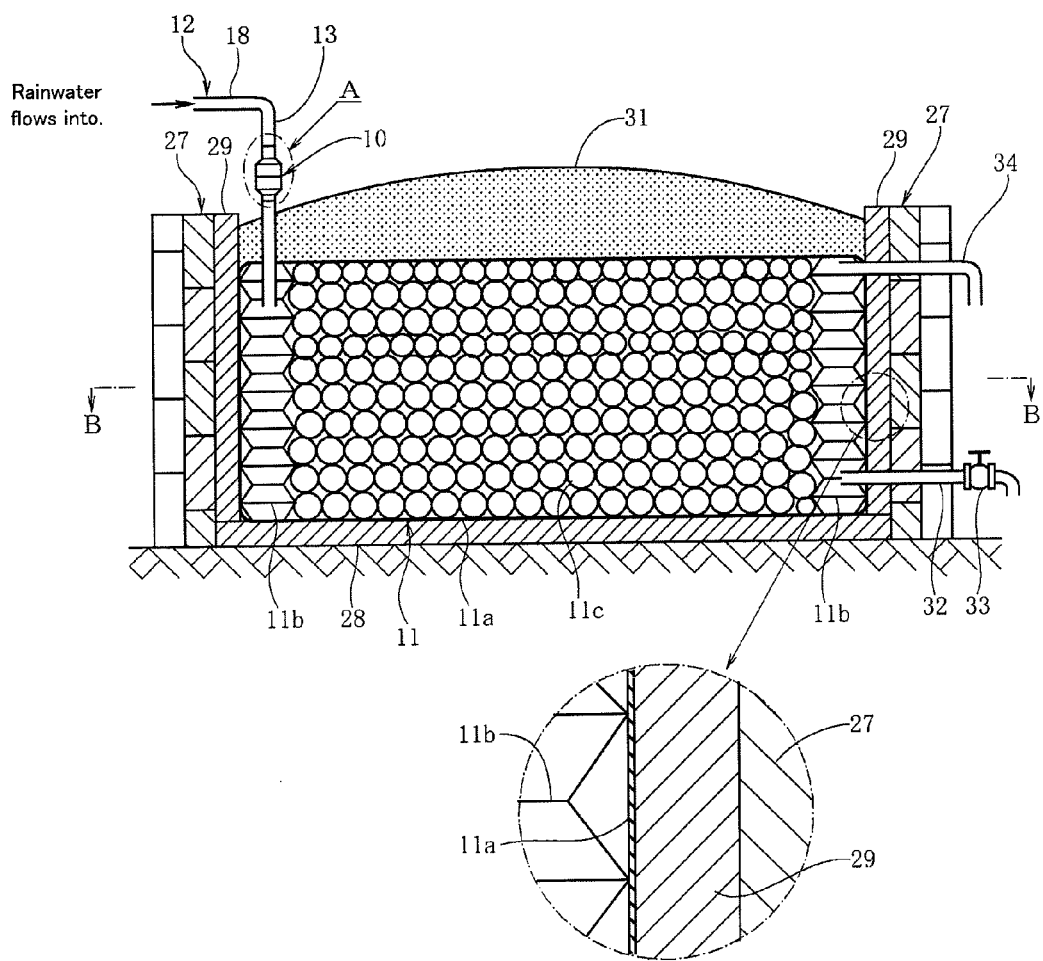
FIG. 4 is a longitudinal cross-sectional block diagram of a rainwater storage device including the rainwater filtering device.

As shown in FIG. 1 and FIG. 4, a rainwater filtering device 10 includes an inflow path 12 through which collected rainwater is led to a rainwater containing section 11, a tube body 14 that is provided in a vertically extending manner in the middle of a vertical pipe 13 located immediately before a position in the inflow path 12 at which the rainwater flows into the rainwater containing section 11, a bag-like filter 16 having an open upper end and a closed lower end, mounting and dismounting means 17 provided to the vertical pipe 13 in order to dismount the tube body 14 and the filter 16 provided to the vertical pipe 13 from the vertical pipe 13 and mount them to the vertical pipe 13. For example, rain that has fallen on a roof of a house is collected in an eaves gutter (not shown), and this collected rainwater flows down in a downspout (not shown), further passes through the inflow path 12, and collected in the rainwater containing section 11. In this embodiment, the inflow path 12 has a horizontal pipe 18 having one end connected to a lower end of the downspout and the other end placed above the rainwater containing section 11 and the vertical pipe 13 having one end connected to the other end of the horizontal pipe 18 and the other end inserted in the rainwater containing section 11. This vertical pipe 13 is constituted of an upper vertical pipe 13a and a lower vertical pipe 13b, and a predetermined gap is formed between a lower end of the upper vertical pipe 13a and an upper end of the lower vertical pipe 13b.

It is to be noted that a net plate (not shown) having a relatively rough mesh for removing large wastes such as leaves or twigs flowing together with the rainwater is provided at a connection between the eaves gutter and the drainspout. Further, it is preferable to provide a rainwater flow divider (not shown) that removes relatively small wastes such as sand at a halfway position of the drainspout. Although not shown, this rainwater flow divider includes a ring-like concave groove that receives the rainwater that has flowed down along an inner peripheral surface of an upper drainspout, a plurality of through holes that are formed in a bottom portion of this concave groove to be aligned in a circumferential direction and lead the rainwater in the concave groove to a sewage system, and an inner peripheral wall that is formed into a tapered shape having an inside diameter gradually reduced toward the lower side and leads the rainwater overflowing from the concave groove to a lower drainspout. In this flow divider, when the rainwater containing sand and others deposited on the roof all flows to the sewage system via the through holes of the flow divider at the time of light rain in the initial stage of rainfall and intensity of rainfall increases, the relatively clean rainwater overflows from the concave groove and flows down in the lower drainspout via the inner peripheral wall of the flow divider.

On the other hand, the tube body 14 is formed into a cylindrical shape using a water permeable porous material (e.g., a porous ceramic pipe), a perforated member (e.g., a plastic tube that has a plurality of holes formed therein and is made of vinyl chloride and the like), a hard net (e.g., a member obtained by forming a radially thick net made of plastic into a cylindrical shape), or a slit member (e.g., a plastic tube that extends in the longitudinal direction, has a plurality of slits formed therein, and made of vinyl chloride and the like). This tube body 14 is formed to have an inside diameter larger than an outside diameter of the vertical pipe 13 and an outside diameter of a later-described rainwater guide pipe 26. That is, a ring-like path 30 is provided between an inner peripheral surface of the tube body 14 and an outer peripheral surface of the rainwater guide pipe 26 (FIG. 1), and the rainwater guide pipe 26 is configured in such a manner that it can be detachably inserted with a gap into the tube body 14. The tube body 14 is formed to have a height smaller than the predetermined gap between the lower end of the upper vertical pipe 13a and the upper end of the lower vertical pipe 13b. Furthermore, the filter 16 is formed into a cylindrical shape using non-woven fabric or woven fabric. In this embodiment, the filter 16 is contained in the tube body 14. Moreover, an upper part of the filter 16 is folded back outwards at the upper end of the tube body 14 and fixed to the outer peripheral surface of the tube body 14 by an upper band 19 in a state that it is put on the upper end and the outer peripheral surface of the tube body 14, and a lower end of the filter 16 is closed by a lower band 21. In this embodiment, the filter 16 is formed to be longer than the tube body 14. Therefore, when the upper part of the filter 16 is fixed on the outer peripheral surface of the tube body 14, a central portion of the filter 16 is contained in the tube body 14, and a lower portion of the filter 16 protrudes toward the lower side of the tube body 14. Additionally, although depending on a mesh size of net (an aperture), the filter 16 is constituted so that it can capture dust of, e.g., 100 μm or above in the rainwater while allowing the rainwater to pass therethrough. It is preferable to use as the upper band 19 a banding band that can again fix the upper end of the filter 16 after being removed, and preferable to use as the lower band 21 a banding band that can again easily close the lower end of the filter 16 after being removed. It is to be noted that the filter is contained in the tube body in this embodiment, the tube body outer side may be covered with the filter.

The mounting and dismounting means 17 is provided between the upper vertical pipe 13a and the lower vertical pipe 13b. That is, the mounting and dismounting means 17 is provided to connect the upper vertical pipe 13a and the lower vertical pipe 13b to each other so that the predetermined gap between the lower end of the upper vertical pipe 13a and the upper end of the lower vertical pipe 13b is closed. This mounting and dismounting means 17 has a funnel-shaped fixed pipe 22 that has a lower end connected to the upper end of the lower vertical pipe 13b and constitutes a part of the vertical pipe 13, a water permeable plate 23 provided in the fixed pipe 22, a movable pipe 24 that has an upper end freely fitted on the lower end of the upper vertical pipe 13a and constitutes a part of the vertical pipe 13, and the rainwater guide pipe 26 provided integrally with the movable pipe 24. The fixed pipe 22 is constituted of a secured pipe portion 22a that has a lower end secured to the upper end of the lower vertical pipe 13b, a fixed taper pipe portion 22b that has a lower end connected to an upper end of the secured pipe portion 22a and is gradually widened toward the upper side, and a fixed large-diameter pipe portion 22c that has a lower end connected to an upper end of the fixed taper pipe portion 22b. The secured pipe portion 22a, the fixed taper pipe portion 22b, and the fixed large-diameter pipe portion 22c are integrally made of plastic such as vinyl chloride. Further, the fixed large-diameter pipe portion 22c is formed to have a diameter larger than those of the lower vertical pipe 13b and the tube body 14.

In this embodiment, the water permeable plate 23 is formed of a perforated plate, i.e., a plastic plate of vinyl chloride or the like having a plurality of small holes 23a formed therein. This water permeable plate 23 is contained in a connection between the fixed taper pipe portion 22b and the fixed large-diameter pipe portion 22c in the fixed pipe 22, and it is configured in such a manner that the tube body 14 can be placed on this water permeable plate 23. Here, in a state that the tube body 14 is placed on the water permeable plate 23, a gap formed between the upper end of the tube body 14 and the lower end of the upper vertical pipe 13a is set in such a manner that the tube body 14 can be taken out from the fixed pipe 22 or contained in the fixed pipe 22. Furthermore, an open hole 23b in which the lower portion of the filter 16 can be detachably inserted with a gap and which is smaller than the tube body 14 is formed at the center of the water permeable plate 23. It is to be noted that the perforated plate is adopted as the water permeable plate in this embodiment, but a porous plate, a slit plate, or a net-like hard plate can be used.

The movable pipe 24 is constituted of a movable large-diameter pipe portion 24a that is detachably inserted in the fixed large-diameter pipe portion 22c, a movable taper pipe portion 24b that has a lower end connected to the movable large-diameter pipe portion 24a and is gradually narrowed toward the upper side, and a freely-fitted pipe portion 24c that has a lower end connected to an upper end of the movable taper pipe portion 24b and is freely fitted on the upper vertical pipe 13a. The movable large-diameter pipe portion 24a, the movable taper pipe portion 24b, and the freely-fitted pipe portion 24c are integrally made of plastic such as vinyl chloride. Moreover, the movable large-diameter pipe portion 24a is formed to have a diameter larger than those of the upper vertical pipe 13a and the tube body 14. Additionally, the rainwater guide pipe 26 is formed to have the same diameter as that of the freely-fitted pipe portion 24c, and it is provided to protrude from a lower end of the freely-fitted pipe portion 24c toward the lower side. This rainwater guide pipe 26 is detachably inserted with a gap into the upper part of the tube body 14 mounted on the water permeable plate 23, and this pipe 26 is configured in such a manner that it can be freely fitted on the upper vertical pipe 13a. That is, the freely-fitted pipe portion 24c and the rainwater guide pipe 26 have diameters larger than that of the upper vertical pipe 13a and smaller than that of the tube body 14.

Specifically, the ring-like path 30 surrounded by the inner peripheral surface of the tube body 14 and the outer peripheral surface of the rainwater guide pipe 26 is configured so that the amount of rainwater permitted to pass through the lateral cross-sectional area of the ring-like path 30 corresponds to the maximum amount of the rainwater which passes through the vertical pipe 13 of the inflow path 12 (FIG. 1). Here, the ring-like path 30 has the above-described configuration in order to avoid a situation where the rainwater overflows from a gutter or the like above the inflow path 12 and to always maintain rainwater flow-down performance even if a large amount of rainwater flows down due to heavy rainfall and a part of the rainwater can pass through the filter 16 but the remaining rainwater cannot pass through the filter 16. When an amount of rainfall is considerably large, the water overflows from the ring-like path 30 and flows down through the movable pipe 24 and the fixed pipe 22 to be led to the rainwater containing section 11. It is to be noted that, even if the rainwater overflows from the ring-like path 30 because of heavy rainfall in this manner, water quality of the rainwater stored in the rainwater containing section 11 is hardly affected. That is because a large amount of dust is captured by the filter 16 in the initial stage of rainfall and the rainwater is very clean at the time of regular rainfall. Furthermore, the ring-like gap between the tube body 14 and the fixed large-diameter pipe portion 22c is also configured so that the amount of rainwater permitted to pass through the lateral cross-sectional area of the ring-like path 30 corresponds to the maximum amount of rainwater which passes through the vertical pipe 13 of the inflow path 12. Here, the ring-like gap between the tube body 14 and the fixed large-diameter pipe portion 22c is configured as described above in order that the rainwater overflowing from the ring-like path 30 can all flow down through the lower vertical pipe 13b when intensity of rainfall is increased.

On the other hand, as shown in FIG. 4, the rainwater containing section 11 is installed on the ground, and this rainwater containing section 11 is contained in a rectangular cylindrical concrete frame body 27. The rainwater containing section 11 is formed by filling an impermeable liner 11a with a plurality of storage materials 11b and a plurality of waste materials 11c in this embodiment. The impermeable liner 11a is a synthetic-rubber-based or synthetic-resin-based sheet having water shielding properties, non-woven cloth (not shown) for regular protection overlaps both surfaces of this sheet. Moreover, the storage material 11b is a plastic molded body molded into a truncated pyramid shape using a die, and the waste material 11c is a waste pipe. An upper surface and a lower surface of each storage material 11b are opened, and a plurality of holes (not shown) are formed in a side surface of the storage material. Additionally, the waste pipes 11c are formed by cutting resin pipes such as a plurality of polyvinyl chloride (PVC) pipes or polypropylene (PP) pipes having different diameters to have a predetermined length. The storage materials 11b fill an outer peripheral portion in the rainwater containing section 11, and the waste pipes 11c fill the inside surrounded by the storage materials 11b. Specifically, the plurality of storage materials 11b are arranged and stacked in the form of a square cylindrical shape to form a square tube body, and the inside surrounded by this square tube body is filled with the plurality of waste pipes 11c aligned in a fixed direction. It is to be noted that waste containers such as plastic cups or bowls may be used as the waste materials besides the waste pipes.

Figure 5:
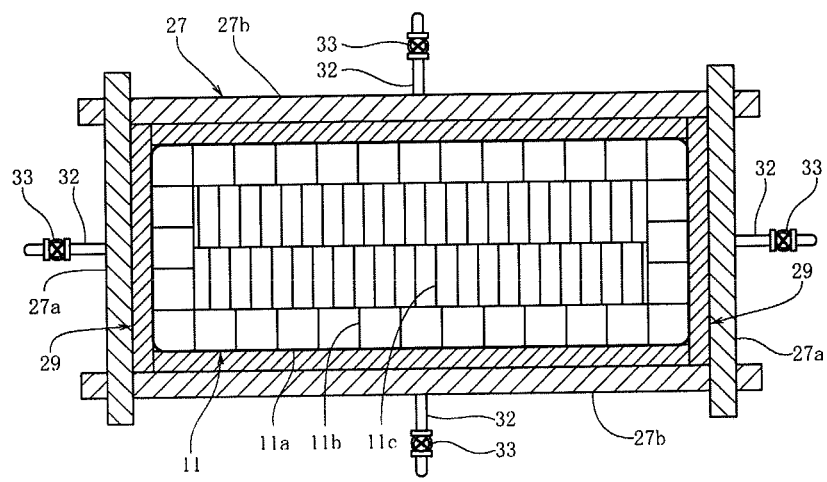
FIG. 5 is a cross-sectional view taken along a line B-B in FIG. 4.
Figure 6:
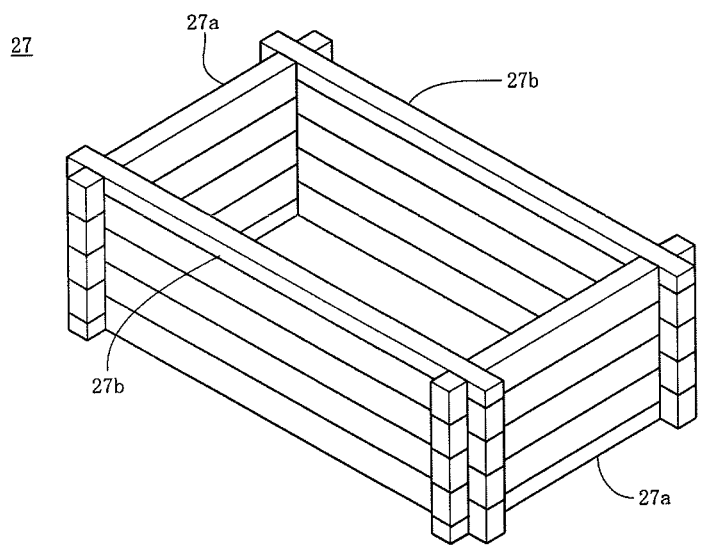
FIG. 6 is a perspective view of a concrete frame body of the rainwater storage device.

The concrete frame body 27 is formed by stacking concrete frame materials 27a and 27b in tiers in a curb-like pattern and coupling these materials with each other (FIG. 4 to FIG. 6). The concrete frame materials 27a and 27b are concrete components previously manufactured in a factory, i.e., precast concrete components so that assembling can be effected on site. This concrete frame body 27 is installed on the ground. Additionally, a lower protective plate 28 having a shock-absorbing function and a heat-insulating function is provided on a lower surface of the rainwater containing section 11, and a side protective plate 29 having a shock-absorbing function and a heat-insulating function is provided between the concrete frame body 27 and the rainwater storage unit 11. The lower protective plate 28 and the side protective plate 29 are made of, e.g., foamed polystyrene or vinyl chloride. Further, an exposed upper surface of the rainwater containing section 11 is covered with soil 31, and plants (not shown) such as lawn are planted in this cover soil 31.

A proximal end of a water supply pipe 32 is connected to the lower portion of the rainwater containing section 11, and a tap 33 is provided at a distal end of this water supply pipe 32. That is, the proximal end of the water supply pipe 32 is connected to the lower portion of each side surface of the rainwater containing section 11, the distal end of the water supply pipe 32 protrudes to the outside of the frame body through the side protective plate 29 and the concrete frame body 27, and the tap 33 is provided at this protruding end. The four water supply pipes 32 are provided in this embodiment (FIG. 5). Furthermore, a proximal end of an overflow pipe 34 is connected to the upper part of the rainwater containing section 11, and a distal end of the overflow pipe 34 is bent downwards and formed to face the lower side (FIG. 4). This overflow pipe 34 is provided to discharge the rainwater overflowing from the rainwater containing section 11. It is to be noted that inserting portions of the lower vertical pipe 13b, the water supply pipe 32, and the overflow pipe 34 for the rainwater containing section 11 are sealed by a seal member (not shown), thereby maintaining water-tightness. Moreover, the lower vertical pipe 13b, the water supply pipe 32, and the overflow pipe 34 are configured to be inserted into the storage materials 11 of the rainwater containing section 11. This configuration facilitates each piping construction. Additionally, the rainwater containing section may have a simple configuration such as a cylindrical shape or a barrel shape having hollow therein rather than such a complicated configuration as shown in FIG. 4 and FIG. 5.

A procedure of assembling the rainwater filtering device 10 to the vertical pipe 13 of the inflow path 12 will now be described. First, the vertical pipe 13 of the inflow path 12 is cut in the middle to provide a predetermined gap. As a result, the vertical pipe 13 is divided into the upper vertical pipe 13a and the lower vertical pipe 13b. Then, the movable pipe 24 is freely fitted on the upper vertical pipe 13a and temporarily fixed in a state that the movable pipe 24 is placed above the lower end of the upper vertical pipe 13a. In this state, the secured portion 22a of the fixed pipe 22 is fitted on the upper end of the lower vertical pipe 13b and secured using an adhesive. Subsequently, the water permeable plate 23 is contained in the secured pipe 22, and then the tube body 14 having the filter 16 disposed thereto is contained in the fixed tube 22 in a state that the tube body 14 is mounted on the water permeable plate 23. Further, the movable pipe 24 is moved down along the upper vertical pipe 13a, and the movable large-diameter pipe portion 24a of the movable pipe 24 is detachably inserted with a gap into the fixed large-diameter pipe portion 22c of the fixed pipe 22. The rainwater filtering device 10 can be assembled to the vertical pipe 13 by such a simple operation (FIG. 1 and FIG. 4).

An operation of the thus assembled rainwater filtering device 10 will now be described. It starts to rain, and the rain that has fallen on a roof of a house is collected in an eaves gutter (not shown) to flow into a downspout (not shown). At this time, large wastes such as leaves or twigs flowing together with the rainwater are captured by a net plate (not shown) provided at the connection between the eaves gutter and the downspout and removed. The rainwater flowing down through the downspout flows into a rainwater flow divider (not shown), and this flow divider separates and removes relatively small wastes such as sand in the rainwater. The rainwater from which the relatively small wastes like sand have been removed by the rainwater flow divider flows into the rainwater filtering device 10 via the horizontal pipe 18 and the upper vertical pipe 13a. This rainwater flows into the filter 16 in the tube body 14 via the freely-fitted pipe portion 24c and the rainwater guide pipe 26, and fine dust in the rainwater is captured by this filter 16. The rainwater that has passed through the filter 16 is stored in the rainwater containing section 11 via the lower vertical pipe 13b. Here, since a flow volume of the rainwater including a relatively large amount of dust in the initial stage of rainfall is relatively small, the rainwater does not overflow from the ring-like path 30 (FIG. 1) between the inner peripheral surface of the tube body 14 and the outer peripheral surface of the rainwater guide pipe 26, and all the rainwater passes through the filter 16. Even if intensity of rainfall is increased, since the filter 16 has a relatively large surface area, the rainwater that has flowed into the filter 16 all passes through the filter 16.

When the intensity of rainfall is further increased, a part of the rainwater that has flowed into the filter 16 passes through the filter 16, but the remaining rainwater cannot pass through the filter 16. At this time, since the ring-like path 30 is provided between the inner peripheral surface of the tube body 14 and the outer peripheral surface of the rainwater guide pipe 26, the rainwater overflows from this ring-like path 30 to be stored in the rainwater containing section 11 via the movable pipe 24, the fixed pipe 22, the water permeable plate 23, and the lower vertical pipe 13b. As a result, a situation that the rainwater overflows from a gutter or the like above the inflow path 12 can be avoided, and the rainwater flow-down performance can be always maintained. Moreover, even if the rainwater overflows from the ring-like path 30 due to heavy rainfall, water quality of the rainwater stored in the rainwater containing section 11 is hardly reduced. That is because a major part of dust is captured by the filter 16 in the initial stage of rainfall and the rainwater is very clean at the time of regular rainfall. That is, the dust deposited on the roof of the house is washed out by the rainwater in the initial stage of rainfall, the rainwater after increasing the intensity of rainfall hardly contains dust, and hence the rainwater stored in the rainwater containing section 11 rarely contains dust having a predetermined or larger particle diameter (e.g., a particle diameter of 100 μm or above). As a result, even if the rainwater stored in the rainwater containing section 11 is sprinkled in a garden by using a hydraulic nozzle (not shown), the hydraulic nozzle is hardly clogged. It is to be noted that, in case of a too slow injection speed of the rainwater from the hydraulic nozzle that is based only on a water level of the rainwater stored in the rainwater containing section 11, increasing a water pressure of the rainwater by using a pump (not shown) is preferable.

Figure 3:
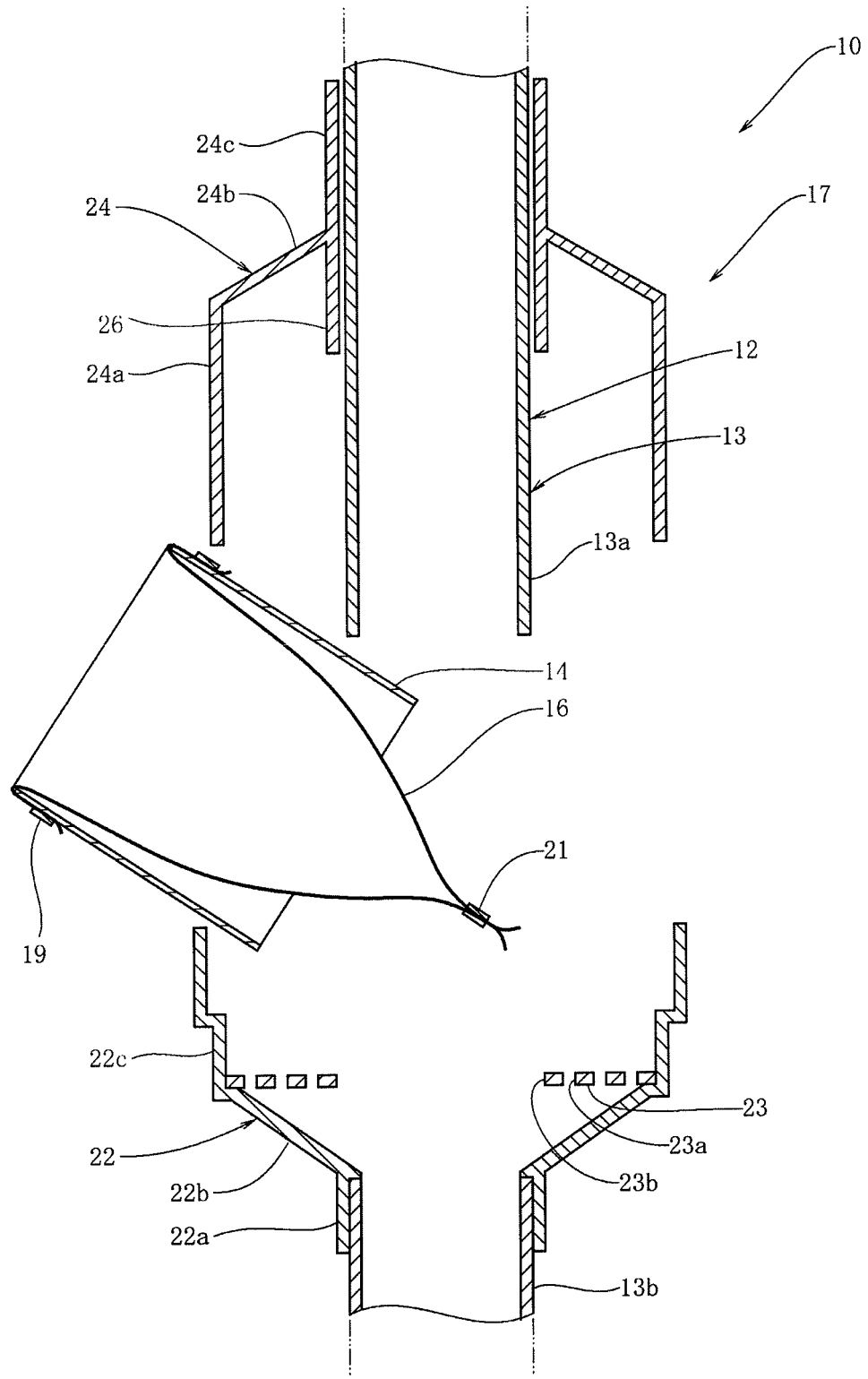
FIG. 3 is a cross-sectional view showing a state that a tube body and a filter are taken out from the rainwater filtering device, which is associated with FIG. 1.

When the dust contained in the rainwater is captured and the filter 16 is clogged, the movable pipe 24 is first pulled up together with the rainwater guide pipe 26 along the upper vertical pipe 13a (FIG. 2), the tube body 14 and the filter 16 are taken out from the fixed pipe 22 constituting a part of the vertical pipe 13 in this state (FIG. 3), and then the movable pipe 24 is moved down along the upper vertical pipe 13a. Subsequently, if the durability of the filter 16 is in a state of prior to reach its limit, the filter 16 does not have to be replaced over a long period of time, the upper band 19 is left as it is, the lower band 21 alone is removed, and the filter 16 is cleaned. As a result, filtration performance of the filter 16 can be restored. Incidentally, if it can be recognized that the durability of the filter 16 has reached its limit, the upper band 19 is removed from the tube body 14, and the filter 16 is replaced. Then, the lower end of the cleaned filter 16 is closed by the lower band 21. Further, the movable pipe 24 is again pulled up together with the rainwater guide pipe 26 along the upper vertical pipe 13a, the tube body 14 with the filter 16 is mounted on the water permeable plate 23 in this state and contained in the fixed pipe 22 constituting a part of the vertical pipe 13, and then the movable pipe 24 is moved down along the upper vertical pipe 13a. When the filter 16 is clogged in this manner, the filter 16 contained in the fixed pipe 22 and the movable pipe 24 can be very easily cleaned.

Second Embodiment

Figure 8:
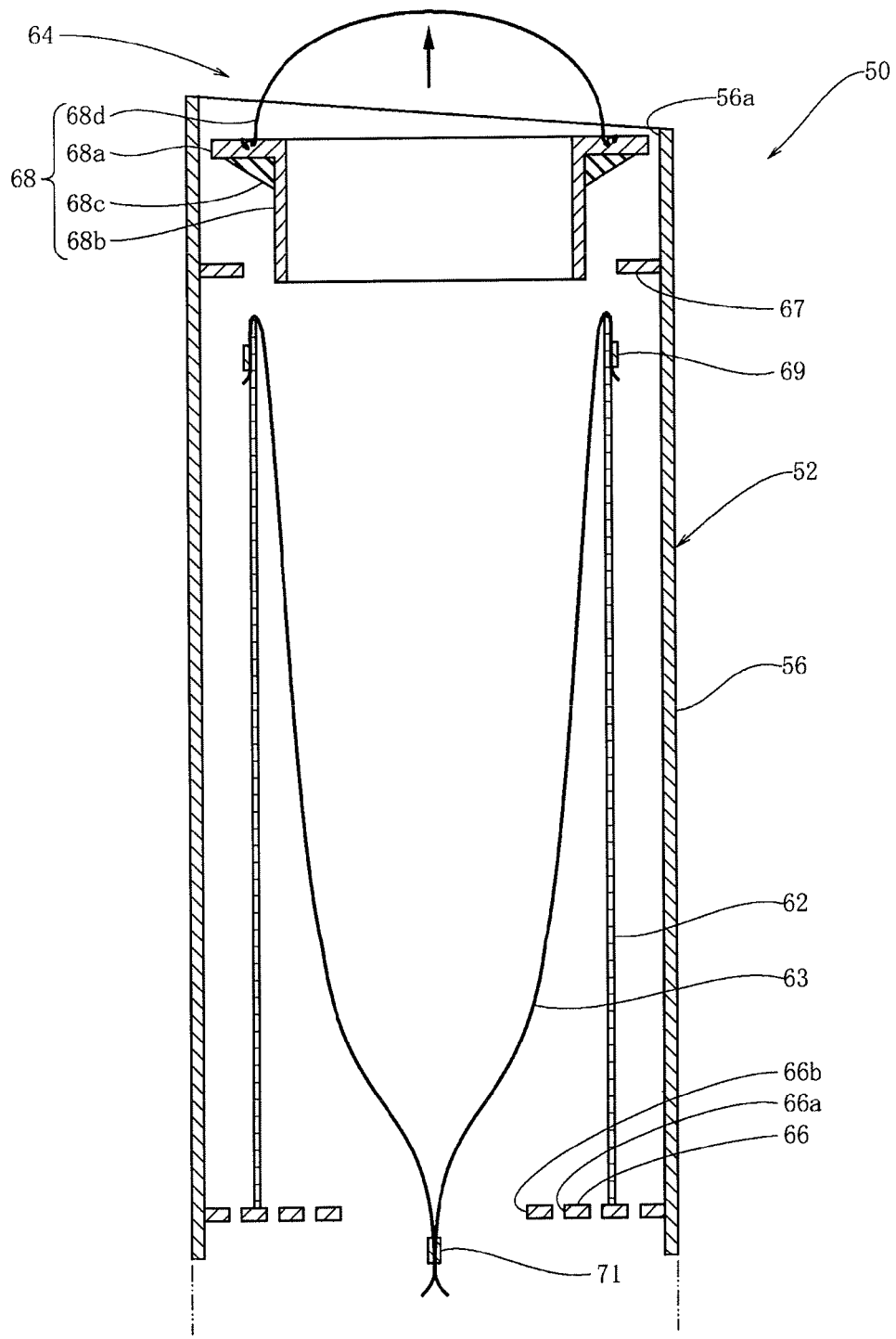
FIG. 8 is a cross-sectional view showing a state that a rainwater guide member of the rainwater filtering device is removed from a vertical pipe, which is associated with FIG. 7.
Figure 9:
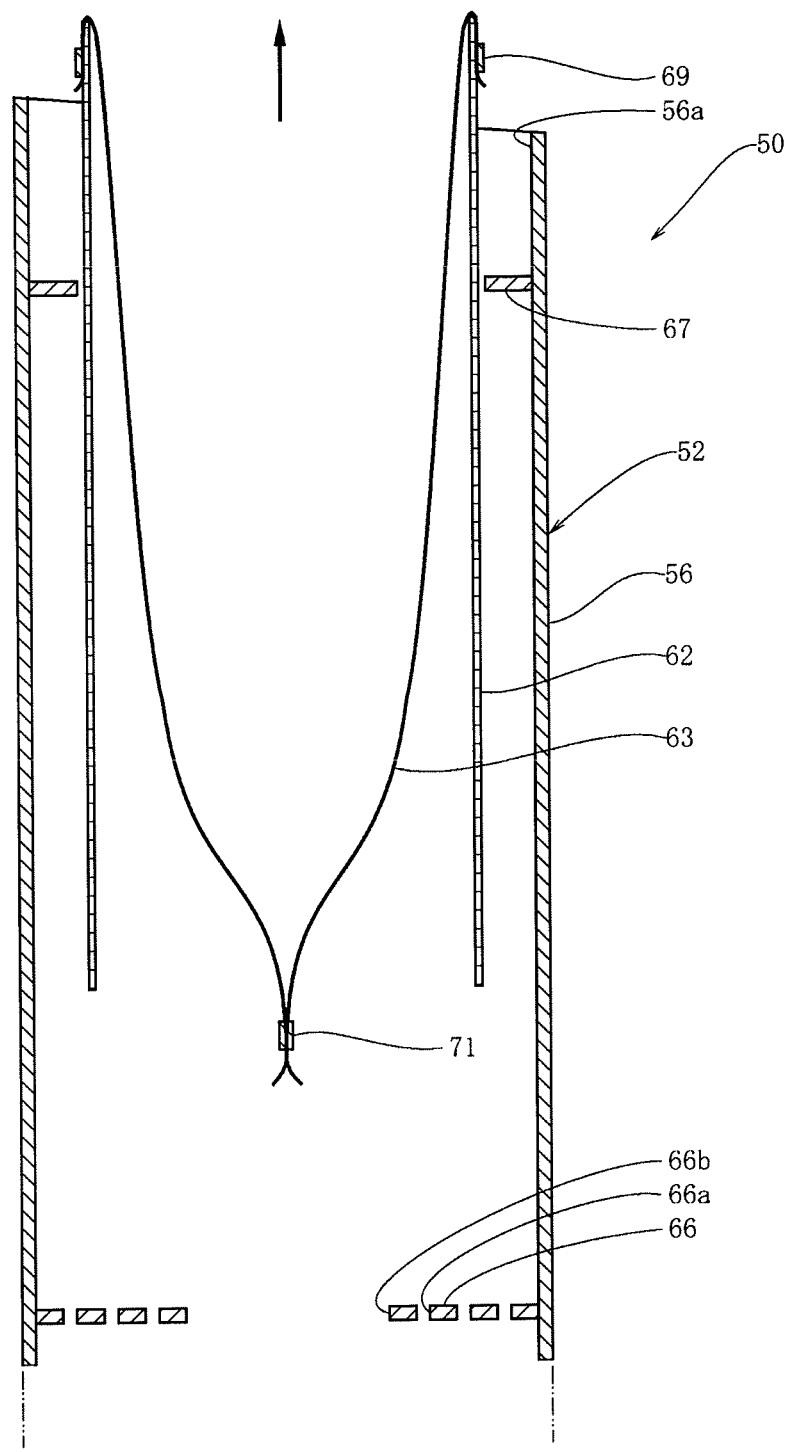
FIG. 9 is a cross-sectional view showing a state that a tube body and a filter of the rainwater filtering device are removed from the vertical pipe, which is associated with FIG. 7.
Figure 10:
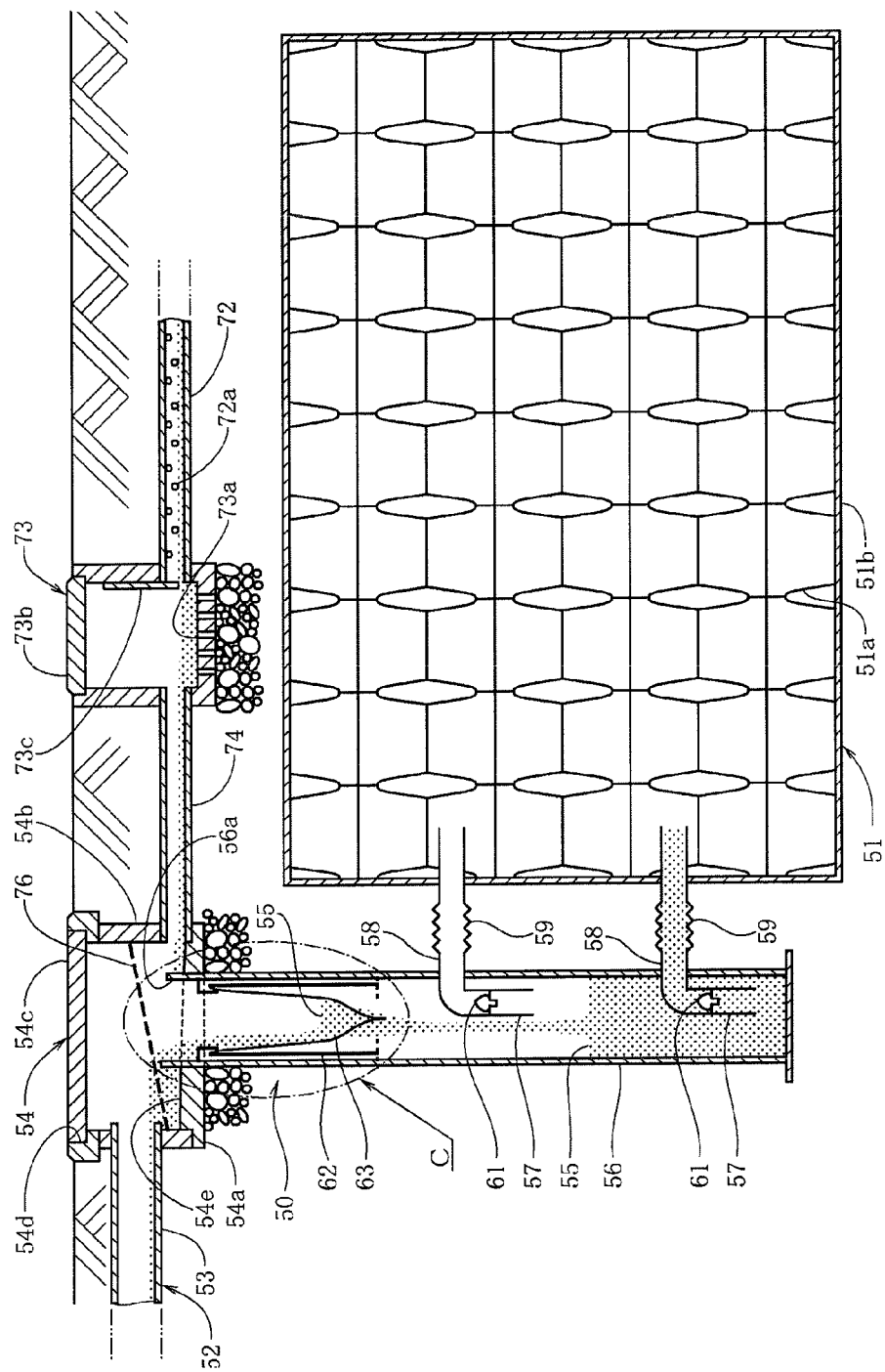
FIG. 10 is a longitudinal cross-sectional block diagram of a dust-proof control inlet including the rainwater filtering device.

FIG. 7 to FIG. 10 show a second embodiment according to the present invention. In this embodiment, a rainwater containing section 51 is buried in the ground, and a rainwater filtering device 50 is provided in an inflow path 52 through which rainwater 55 is led to the rainwater containing section 51. This inflow path 52 has a horizontal pipe 53 that is extended in the horizontal direction and buried in the ground, a bottomed upper inlet 54 that is buried to expose its upper end on the ground surface and is connected to the horizontal pipe 53, and a cylindrical vertical inlet 56 that has an upper part connected to a bottom portion of the upper inlet 54, allows the rainwater 55 fed from the horizontal pipe 53 to flow down from an upper end opening portion 56a, and thereby supplies the rainwater to the rainwater containing section 51 (FIG. 10). The upper inlet 54 is constituted of a bottom wall 54a, a circumferential wall 54b, and a lid plate 54c. The circumferential wall 54b is formed to have a size that enables surrounding an upper end of the vertical inlet 56. The horizontal pipe 53 is connected to and communicates with the circumferential wall 54b, and it is configured to lead to the upper inlet 54 the rainwater 55 that has fallen on a roof or rooftop of a house or the ground surface to be collected. Moreover, an upper end opening portion 54d of the circumferential wall 54b is closed by the lid plate 54c so as to be openable. Additionally, the upper part of the vertical inlet 56 is attached to the bottom wall 54a of the upper inlet 54 by insertion. That is, the upper part of the vertical inlet 56 is attached to the bottom wall 54a of the upper inlet 54 by insertion in such a manner that a circumferential groove 54e can be formed between the upper circumference of the vertical inlet 56 and the circumferential wall 54b of the upper inlet 54. Further, the circumferential groove 54e is configured to temporarily store the rainwater 55 supplied from the horizontal pipe 53, which is the rainwater 55 before flowing into the upper end opening portion 56a of the vertical inlet 56. When the rainwater 55 is temporarily stored in the circumferential groove 54e, wastes such as sand contained in the rainwater 55 can be precipitated.

The vertical inlet 56 is formed into a bottomed cylindrical shape and configured in such a manner that the rainwater 55 that has flowed into the upper inlet 54 from the horizontal pipe 53 flows into the vertical inlet 56 from the upper end opening portion 56a of the vertical inlet 56 through the circumferential groove 54e. The rainwater 55 that has flowed in from the upper end opening portion 56a is stored in this vertical inlet 56, and then it flows into the rainwater containing section 51 through vertical short pipes 57 and rainwater supply pipes 58. The rainwater supply pipes 58 are vertically provided at two positions on the vertical inlet 56 at a predetermined interval therebetween and extended in the horizontal direction, and the vertical short pipes 57 communicate with and are connected to end portions of the rainwater supply pipes 58 opened in the vertical inlet 56, respectively. Furthermore, a bellows 59 is provided to each rainwater supply pipe 58 in order to absorb a fluctuation in relative position of the vertical inlet 56 and the rainwater containing section 51. Each vertical short pipe 57 is opened to face the bottom portion of the vertical inlet 56, and it is configured in such a manner that the rainwater 55 stored in the vertical inlet 56 enters from the lower end of this vertical short pipe 57 to flow up and flows through each rainwater supply pipe 58 to be supplied to the rainwater storage unit 51. Additionally, a check valve 61 is provided to each vertical short pipe 57. The check valve 61 allows the rainwater 55 to flow into the rainwater containing section 51 from the inside of the lower vertical short pipe 57 when a water level in the vertical short pipe 57 below this valve 61 is equal to or above a water level in the rainwater containing section 51, and it prevents the rainwater 55 in the rainwater containing section 51 from flowing into the lower vertical short pipe 57 when the water level in the vertical short pipe 57 below the valve 61 is lower than the water level in the rainwater containing section 51.

Figure 7:
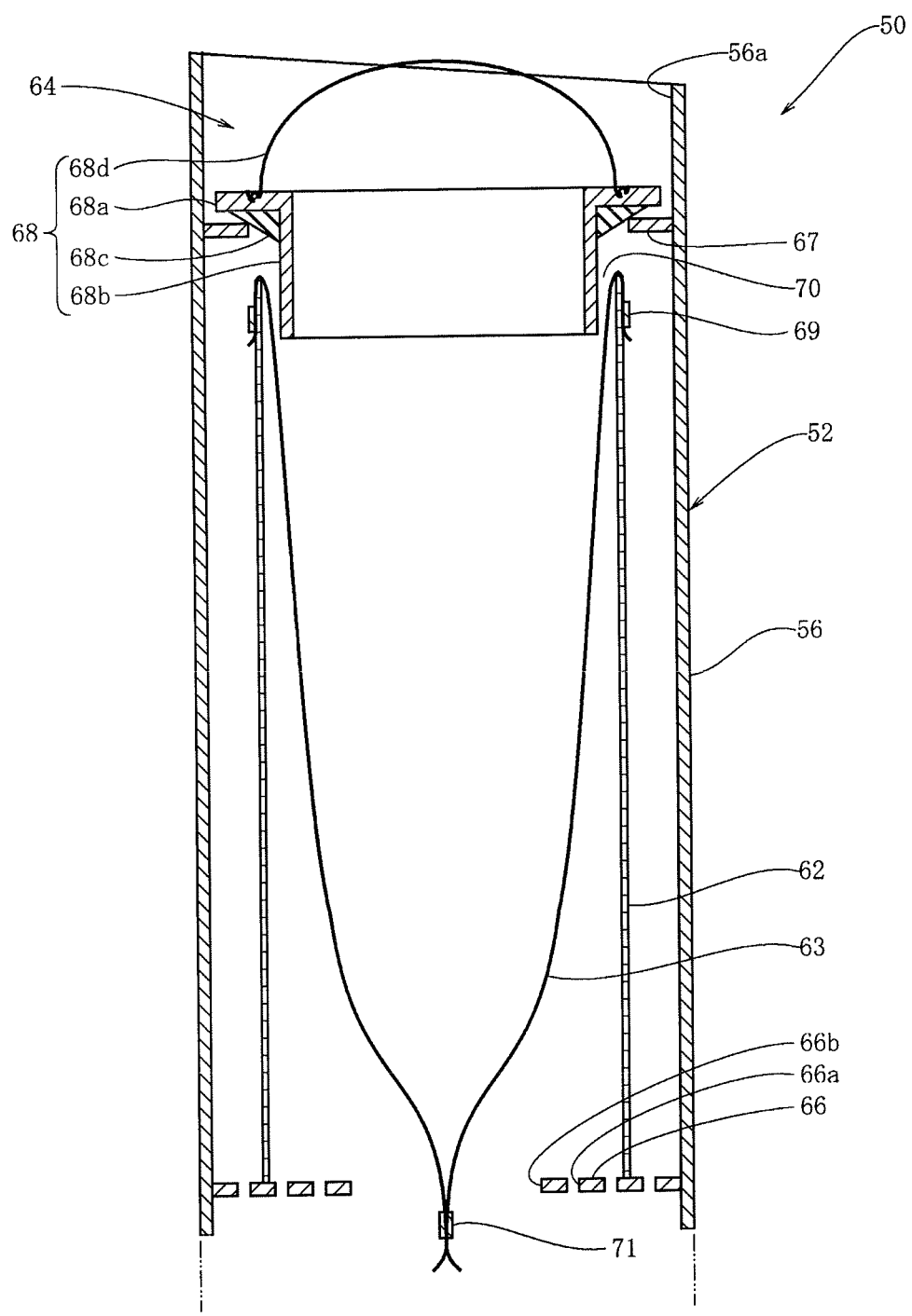
FIG. 7 is an enlarged longitudinal cross-sectional view of a part C in FIG. 10, showing a rainwater filtering device according to a second embodiment of the present invention.

A tube body 62 and a filter 63 of the rainwater filtering device 50 are provided in the vertical inlet 56, and mounting and dismounting means 64 for dismounting the tube body 62 and the filter 63 from the vertical inlet 56 and mounting them to the vertical inlet 56 is also provided in the vertical inlet 56 (FIG. 7 to FIG. 9). The mounting and dismounting means 65 has a water permeable plate 66 which is secured to an inner surface of the vertical inlet 56 in the middle and on which the tube body 62 is mounted, a ring-like receiving member 67 secured to the inner surface of the vertical inlet 56 so that it can be placed above an upper end of the tube body 62 placed on the water permeable plate 66, and a cylindrical rainwater guide member 68 having an upper end placed on the receiving member 67 and a lower end detachably inserted with a gap into the upper part of the tube body 62. The water permeable plate 66 is formed of a perforated plate, i.e., a plastic plate made of vinyl chloride or the like having a plurality of small holes 66a formed therein like the water permeable plate according to the first embodiment. The water permeable plate 66 is horizontally secured to the inner surface of the vertical inlet 56 above the two rainwater supply pipes 58 and 58 at a position where the entire tube body 62 can be contained in the vertical inlet 56 when the tube body 62 is placed on the water permeable plate 66. Moreover, an open hole 66b into which the lower portion of the filter 63 can be detachably inserted with a gap and which is smaller than the tube body 62 is formed at the center of the water permeable plate 66. It is to be noted that the perforated plate is adopted as the water permeable plate in this embodiment, but a porous plate, a slit plate, a net-like hard plate, and others may be used.

Like the tube body according to the first embodiment, the tube body 62 is formed into a cylindrical shape using a water permeable porous material (e.g., a porous ceramic pipe), a perforated member (e.g., a plastic pipe of vinyl chloride or the like having a plurality of holes formed therein), a hard net (e.g., a product obtained by forming a radially thick plastic net into a cylindrical shape), or a slit member (e.g., a plastic pipe of vinyl chloride or the like that extends in the longitudinal direction and has a plurality of slits formed therein). Further, a ring-like path 70 surrounded by an inner peripheral surface of the tube body 62 and an outer peripheral surface of a cylindrical portion 68b of the rainwater guide member 68 is configured so that the amount of rainwater permitted to pass through the lateral cross-sectional area of the ring-like path 30 corresponds to the maximum amount of rainwater which passes through the inflow path 52 (FIG. 7). Here, the ring-like path 70 is configured as described above in order to avoid a situation that the rainwater 55 overflows from the upper inlet 54 and always maintain flow-down performance of the rainwater 55 even if the large amount of rainwater 55 flows down due to heavy rainfall and a part of the rainwater passes through the filter 63 but the remaining water cannot pass through the filter 63. When an amount of rainfall is considerably large, the water overflows from the ring-like path 70 and flows down in the vertical inlet 56 to be led to the rainwater containing section 51. It is to be noted that, even if the rainwater 55 overflows from the ring-like path 70 because of heavy rainfall in this manner, water quality of the rainwater 55 stored in the rainwater containing section 51 is hardly affected. That is because a major part of dust is captured by the filter 63 in the initial stage of rainfall and the rainwater 55 is very clean at the time of regular rainfall. Furthermore, the ring-like gap between the tube body 62 and the vertical inlet 56 is also configured so that the amount of rainwater permitted to pass through the lateral cross-sectional area of the ring-like path 70 corresponds to the maximum amount of rainwater which passes through the inflow path 52. Here, the ring-like gap between the tube body 62 and the vertical inlet 56 is configured as described above in order that all of the rainfall 55 overflowing from the ring-like gap between the tube body 62 and the vertical inlet 56 can flow down in the vertical inlet 56 when intensity of rainfall is increased.

An outside diameter of the receiving member 67 is formed to be equal to an inside diameter of the vertical inlet 56, and an inside diameter of the receiving member 67 is formed to be larger than an outside diameter of the tube body 62. Moreover, the rainwater guide member 68 is constituted of a flange portion 68a mounted on the receiving member 67 and the cylindrical portion 68b detachably inserted with a gap in the upper part of the tube body 62. The flange portion 68a and the cylindrical portion 68b are integrally formed of plastic such as vinyl chloride. When the rainwater guide member 68 is removed from the vertical inlet 65, the tube body 62 and the filter 63 can be taken out from the vertical inlet 56 and can be contained in the vertical inlet 56. It is to be noted that reference numeral 68c in FIG. 7 to FIG. 9 denotes a seal member provided to the rainwater guide member 68 so as to be appressed against the receiving member 67 when the rainwater guide member 68 is mounted on the receiving member 67, and reference numeral 68d designates a handgrip provided to the rainwater guide member 68 in order to remove the rainwater guide member 68 from the vertical inlet 56.

Like the filter according to the first embodiment, the filter 63 is formed into a cylindrical shape using nonwoven cloth or woven cloth. The filter 63 is contained in the tube body 62 in this embodiment. Additionally, an upper part of the filter 63 is folded back toward the outside at the upper end of the tube body 62 and fixed on the outer peripheral surface of the tube body 62 by an upper band 69 while covering the upper end and the outer peripheral surface of the tube body 62, and a lower end of the filter 63 is closed by a lower band 71. In this embodiment, the filter 63 is formed to be slightly longer than the tube body 62. Therefore, when the upper part of the filter 63 is fixed on the outer peripheral surface of the tube body 62, a central portion of the filter 63 is contained in the tube body 62, and a lower portion of the filter 63 slightly protrudes toward the lower side of the tube body 62. Further, the filter 63 is configured to allow passing the rainwater 55 therethrough and enable capturing dust of 100 μm or above in the rainwater 55. It is to be noted that the filter is contained in the tube body in this embodiment, an outer side of the tube body may be covered with the filter.

On the other hand, the rainwater storage unit 51 is formed by covering an assembly, which is formed by combining a plurality of storage materials 51a, with an impermeable liner 51b (FIG. 10). As the storage material 51a, a molded body of plastic molded using a die is adopted. The storage materials 51a each formed of the plastic molded body are formed into a truncated pyramid shape, vertically and horizontally arranged, and then stacked in tiers, thereby obtaining the assembly of the storage materials 51a. On the other hand, the impermeable liner 51b covering these storage materials 51a is a synthetic-rubber-based or synthetic-resin-based sheet having water shielding properties, non-woven cloth for regular protection overlaps both surfaces of this sheet. This rainwater containing section 51 is formed by arranging the impermeable liner 51b at a drilled position, arranging the storage materials 51a at the central portion lengthwise and crosswise and in a vertical direction to obtain the assembly, then raising the periphery of the impermeable liner 51b to surround the periphery of the assembly of the storage materials 51a by the impermeable liner 51b, and mounting the end portion of the impermeable liner 51b on the upper surfaces of the storage materials 51a to wrap the impermeable liner 51b around the assembly of the storage materials 51a. Here, when the single impermeable liner 51b does not have a size that enables wrapping around the assembly of the storage materials 51a, the plurality of impermeable liners 51b are prepared and thermally fused at edges thereof to integrate these liners, whereby the size enabling wrapping around the assembly of the storage materials 51 can be obtained and the impermeable liner 51b subjected to water leakage prevention at the fused portion can be obtained. This rainwater containing section 51 is configured in such a manner that the rainwater 55 can be stored in gaps between the storage materials 51a.

On the other hand, one end of a drainage pipe 72 communicates with and is connected to a circumferential groove of the upper inlet 54, and the other end of the drainage pipe 72 communicates with and is connected to a sewage pipe (not shown). This drainage pipe 72 is configured to flow the rainwater 55 in the circumferential groove 54e into the sewage pipe, and a so-called perforated pipe having a plurality of small holes 72a formed in the periphery thereof is used as the drainage pipe 72. Further, the drainage pipe 72 constituted of this perforated pipe is buried in the ground to flow the excess rainwater 55 into the sewage pipe while allowing the rainwater 55, which has flowed in from the circumferential groove 54e, to permeate into the peripheral ground. Furthermore, a grit tank 73 communicating with the circumferential groove 54e is also provided in the upper inlet 54. The grit tank 73 is a so-called permeation type inlet that has a plurality of through small holes 73a therethrough the rainwater 55 can permeate formed in a bottom portion thereof and is provided with a lid 73b, and it is buried to be aligned with the upper inlet 54 to provide a predetermined gap from the upper inlet 54, the upper inlet 54 and the grit tank 73 communicating with and being connected to each other through a coupling pipe 74. The circumferential groove 54e in the upper inlet 54 communicates with and is connected to the grit tank 73 through the coupling pipe 74, and one end of the drainage pipe 72 communicates with and is connected to this grit tank 73. The horizontal pipe 53 and the coupling pipe 74 are connected to opposing surfaces of the circumferential wall 54b, respectively, and a connection of the coupling pipe 74 for the circumferential wall 54b is provided at a position lower than a connection of the horizontal pipe 53 for the circumferential wall 54b. Further, an upper surface of the bottom wall 54a of the upper inlet 54 is formed into an inclined surface that is gradually lowered toward the coupling pipe 74 from the horizontal pipe 53 in such a manner that the rainwater 55 that has flowed into the circumferential groove 54e from the horizontal pipe 53 can flow into the coupling pipe 74. Furthermore, the circumferential wall 54b is formed to bend or slant in such a manner that a width of the inner surface is reduced as getting closer to the coupling pipe 74 side from the horizontal pipe 53 side.

On a sidewall of the grit tank 73 coupled with the drainage pipe 72 is provided an adjustment gate 73c that increases or decreases a hole area of the drainage pipe 72 to adjust a flow volume of the rainwater flowing into the sewage pipe from the circumferential groove 54e. Further, when the adjustment gate 73c is adjusted in such a manner that a flow volume of the rainwater flowing into the sewage pipe from the circumferential groove 54e becomes equal to or below a flow volume of the rainwater flowing into the vertical inlet 56, the flow volume of the rainwater flowing into the vertical inlet 56 from the upper end opening portion 56a of the vertical inlet 56 can be adjusted to increase or decrease. Furthermore, a net plate 76 is contained in the upper inlet 54. This net plate 76 can be taken out from the open upper end opening portion 54d by removing the lid body 54c, and it is contained in the upper inlet 54 at a slant so as to be gradually raised from the horizontal pipe 53 side toward the coupling pipe 74 side. Moreover, the net plate 76 is configured to cover the upper end opening portion 56a of the vertical inlet 56 and the circumferential groove 54e. Additionally, the net plate 76 is configured to collect relatively large wastes such as leaves or twigs from the rainwater 55 flowing into the upper inlet 54 through the horizontal pipe 53.

An operation of the thus configured rainwater filtering device 50 will now be described. When it starts raining, the rain that has fallen onto a roof of a house or a road surface flows into the horizontal pipe 53. At this time, large wastes such as leaves or twigs flowing together with the rainwater are collected and removed by the net plate 76 contained in the upper inlet 54, and the rainwater 55 from which the large wastes have been removed flows into the circumferential groove 54e of the upper inlet 54. The rainwater 55 that has flowed into this circumferential groove 54e flows through the circumferential groove 54e toward the coupling pipe 74, and a part of relatively small wastes such as sand contained in the rainwater 55 is precipitated and removed during this process (FIG. 10). Further, the rainwater 55 flows into the grit tank 73 through the coupling pipe 74, and a remaining part of the relatively small wastes, e.g., sand contained in the rainwater 55 is precipitated, removed, and discharged to a sewage system here. It is to be noted that, since a flow volume of the rainwater is small in the initial stage of rainfall, a water level of the rainwater 55 in the circumferential groove 54e does not reach the upper end opening portion 56a of the vertical inlet 56, and hence the rainwater 55 does not flow into the vertical inlet 56. On the other hand, when intensity of rainfall increases, the flow volume of the rainwater flowing into the circumferential groove 54e grows, the water level of the rainwater 55 in the circumferential groove 54e reaches the upper end opening portion 56a of the vertical inlet 56, and a major part of the rainwater 55 flows into the vertical inlet 56. The rainwater 55 that has flowed down in the vertical inlet 56 flows into the filter 63 through the cylindrical portion 68b of the rainwater guide member 68, and fine dust in the rainwater 55 is captured by this filter 63. The rainwater 55 that has passed through the filter 63 is temporarily stored in the vertical inlet 56, and it passes through the vertical short pipe 57 and the rainwater supply pipe 58 to be stored in the rainwater containing section 51 when a stored amount becomes equal to or above a predetermined amount.

When the intensity of rainfall further increases, a part of the rainwater 55 that has flowed into the filter 63 passes through the filter 63, but the remaining rainwater cannot pass through the filter 63. At this time, since the ring-like path 70 is provided between the inner peripheral surface of the tube body 62 and the outer peripheral surface of the cylindrical portion 68b of the rainwater guide member 68, the rainwater 55 overflows from this ring-like path 70, passes through the water permeable plate 66 to be temporarily stored in the vertical inlet 56, and then is stored in the rainwater containing section 51 (FIG. 7 and FIG. 10). As a result, a situation that the rainwater 55 overflows from the upper inlet 54 can be avoided, and flow-down performance of the rainwater 55 can be always maintained. Furthermore, even if the rainwater overflows from the ring-like path 70 due to heavy rainfall in this manner, water quality of the rainwater 55 stored in the rainwater containing section 51 is hardly reduced. That is because a major part of dust is captured by the filter 63 in the initial stage of rainfall and the rainwater 55 is very clean at the time of regular rainfall. That is, since the dust deposited on the roof of the house is washed out by the rainwater 55 in the initial stage of rainfall and the rainwater 55 hardly contains dust at the time of increase in intensity of rainfall, the rainwater stored in the rainwater containing section 51 rarely contains dust having a predetermined particle diameter or a larger diameter (e.g., a particle diameter of 100 µm or above). As a result, even if the rainwater stored in the rainwater containing section 51 is sprinkled in a garden using a hydraulic nozzle (not shown), the hydraulic nozzle is hardly clogged. It is to be noted that a pump (not shown) configured to increase a pressure of the rainwater emitted from the hydraulic nozzle is provided between the rainwater containing section 51 and the hydraulic nozzle.

When the filter 63 is clogged because of capture of the dust contained in the rainwater 55, the lid plate 54c is first removed to open the upper end opening portion 54d of the upper inlet 54, the net plate 76 is taken out, the handgrip 68d is subsequently held to remove the rainwater guide member 68 from the vertical inlet 56 through the upper end opening portion 54d of the upper inlet 54 (FIG. 8), and then the tube body 62 and the filter 63 are taken out from the vertical inlet 56 through the upper end opening portion 54d of the upper inlet 54 (FIG. 9). Then, if the durability of the filter 63 is in a state of prior to reach its limit, the filter 63 does not have to be replaced for a long period of time, the upper band 69 is left as it is, and the lower band 71 alone is removed to clean the filter 63. As a result, filtration performance of the filter 63 can be easily restored. Incidentally, when it is recognized that the durability of the filter 63 has reached its limit, the upper band 69 is removed from the tube body 62 to replace the filter 63. Subsequently, the lower end of the cleaned filter 63 is closed by the lower band 71. Furthermore, the tube body 62 provided with the filter 63 is inserted into the vertical inlet 56 from the upper end opening portion 54d of the upper inlet 54, placed on the water permeable plate 66, and contained in the vertical inlet 56. Moreover, the handgrip 68d is held to insert the rainwater guide member 68 into the vertical inlet 56 from the upper end opening portion 54d of the upper inlet 54, the flange portion 68a is placed on the receiving member 67, then the net plate 76 is inserted into the upper inlet 54, and the lid plate 54c is subsequently disposed to the upper inlet 54 to close the upper end opening portion 54d of the upper inlet 54. In this manner, when the filter 63 is clogged, the filter 63 contained in the vertical inlet 56 can be very easily cleaned.

Third Embodiment

Figure 11:
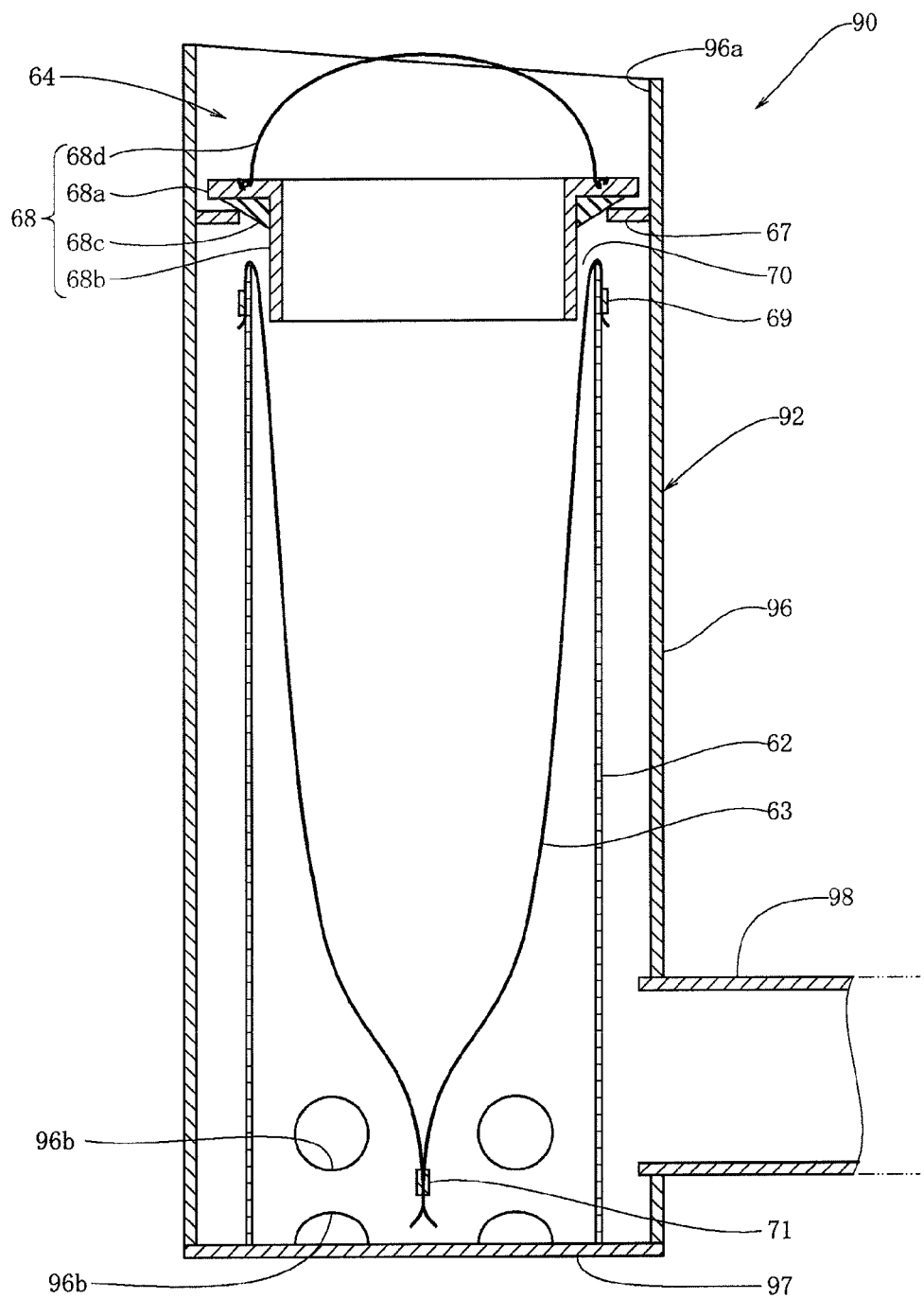
FIG. 11 is an enlarged longitudinal cross-sectional view of a part D in FIG. 12, showing a rainwater filtering device according to a third embodiment of the present invention.
Figure 12:
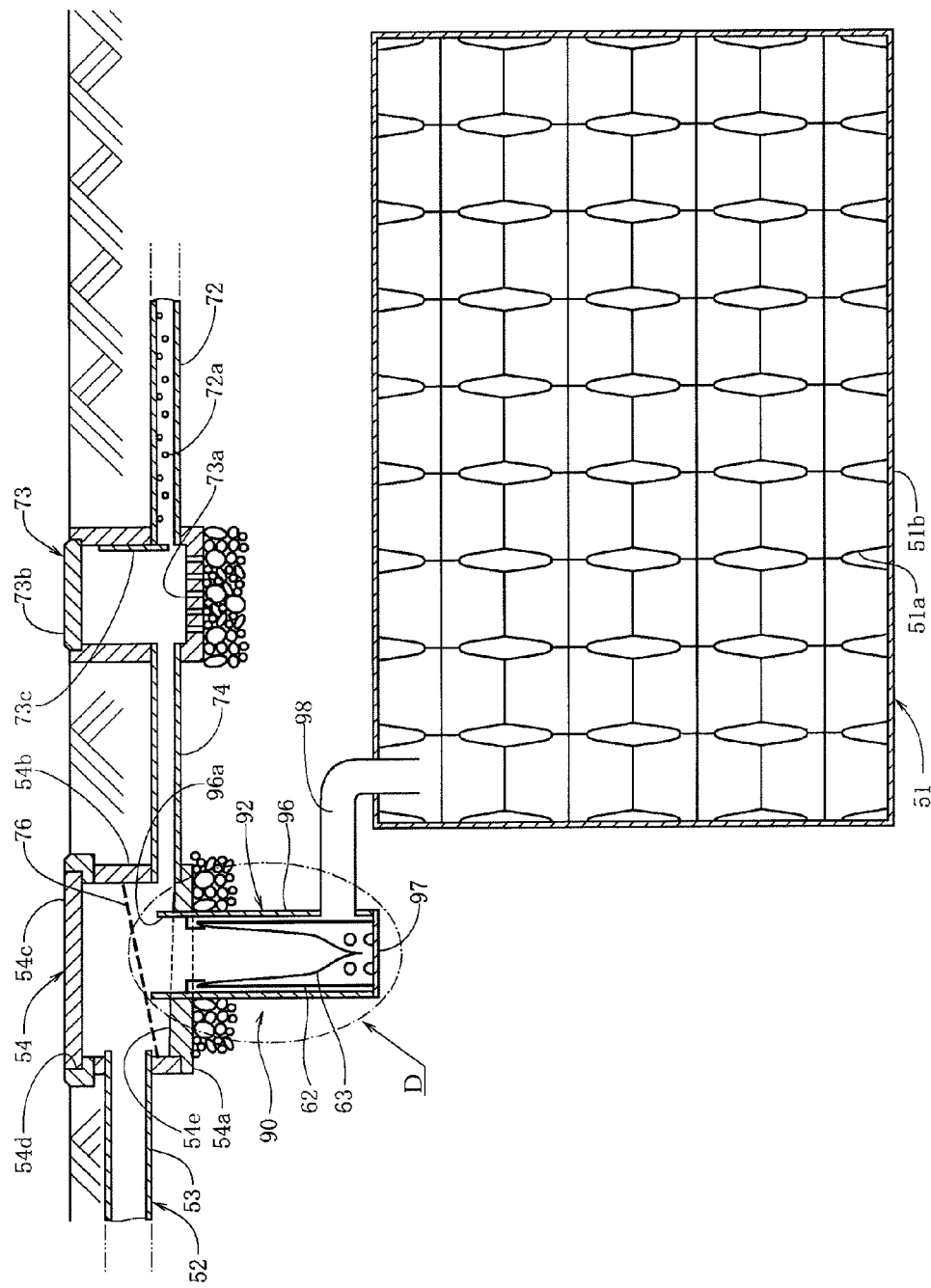
FIG. 12 is a longitudinal cross-sectional block diagram of a dust-proof control inlet including the rainwater filtering device.

FIG. 11 and FIG. 12 show a third embodiment according to the present invention. In FIG. 11 and FIG. 12, like reference numerals denote components equal to those in FIG. 7 to FIG. 10. In this embodiment, mounting and dismounting means 64 has a bottom plate 97 which is secured to a lower end of a vertical inlet 96 and on which a tube body 62 is placed, a ring-like receiving member 67 secured to an inner surface of the vertical inlet 96 so as to be placed above an upper end of the tube body 62 placed on the bottom plate 97, and a cylindrical rainwater guide member 68 having an upper end placed on the receiving member 67 and a lower end detachably inserted with a gap into an upper part of the tube body 62 (FIG. 11). The vertical inlet 96 is formed to be shorter than the vertical inlet according to the second embodiment. An upper end opening portion 96a is formed at an upper end of this vertical inlet 96, a lower end of the vertical inlet is closed by the bottom plate 97, and a plurality of through holes 96b are formed in a lower peripheral surface of the tube body 62. Further, one end of a rainwater supply pipe 98 communicates with and is connected to a lower peripheral surface of the vertical pipe 96, and the other end of the rainwater supply pipe 98 is inserted into a rainwater containing section 51 from an upper surface thereof (FIG. 12). Furthermore, when the rainwater guide member 68 is removed from the vertical inlet 96, the tube body 62 and the filter 63 can be taken out from the vertical inlet 96 or contained in the vertical inlet 96. The other portions are configured to be equal to those in the second embodiment.

In the thus configured rainwater filtering device 90, the water permeable plate in the second embodiment is no longer required. The other operations are substantially equal to the operations in the second embodiment, thereby omitting an overlapping description.

INDUSTRIAL APPLICABILITY

The rainwater filtering device according to the present invention can be utilized as a device that can positively remove fine dust in the rainwater flowing into the rainwater containing section and enables very easily cleaning or replacing the filter when the filter is clogged.

EXPLANATION OF REFERENCE NUMERALS 10, 50, 90 rainwater filtering device
11, 51 rainwater containing section
12, 52, 92 inflow path
13 vertical pipe
13a upper vertical pipe
13b lower vertical pipe
14, 62 tube body
16, 63 filter
17, 64 mounting and dismounting means
22 fixed pipe
24 movable pipe
26 rainwater guide pipe
30, 70 ring-like path
53 horizontal pipe
54 upper inlet
55 rainwater
56, 96 vertical inlet
56a, 96a upper end opening portion of the vertical inlet
67 receiving member
68 rainwater guide member
97 bottom plate

The invention claimed is:

1. A rainwater filtering device for an inflow path, comprising:
an inflow path through which collected rainwater is led to a rainwater containing section;
a water permeable tube body provided in a vertically extending manner in the middle of a vertical member located immediately before a position at which the rainwater flows into the rainwater containing section in the inflow path;
a bag filter that has an open upper end and a closed lower end, the filter being provided on the tube body, and wherein the filter captures dust in the rainwater while allowing the rainwater to pass therethrough; and
a mounting and dismounting member provided to the vertical member in order to dismount the tube body and the filter which are provided to the vertical member from the vertical member and to mount the tube body and the filter to the vertical member, wherein the mounting and dismounting member has a rainwater guide detachably inserted with a gap into an upper part of the tube body, and
a ring-like path surrounded by an inner peripheral surface of the tube body and an outer peripheral surface of the rainwater guide is configured so that the amount of rainwater permitted to pass through the lateral cross-sectional area of the ring-like path corresponds to the maximum amount of rainwater which passes through the inflow path.

2. The rainwater filtering device for an inflow path according to claim 1, wherein the vertical member comprises a vertical pipe having an upper vertical pipe and a lower vertical pipe, and the mounting and dismounting means member is provided between the upper vertical pipe and the lower vertical pipe, the mounting and dismounting member having:
a funnel-shaped fixed pipe that has a lower end connected to an upper end of the lower vertical pipe and an upper end formed to have a larger diameter than the lower vertical pipe and constitutes a part of the vertical pipe;
a water permeable plate which is provided in the fixed pipe and on which the tube body is placed;
a movable pipe that has a lower end detachably inserted with the gap into an upper part of the fixed pipe and an upper end freely fitted on a lower end of the upper vertical pipe and constitutes a part of the vertical pipe; and
the rainwater guide comprising a rainwater guide pipe that is provided integrally with the movable pipe, detachably inserted with the gap into the upper part of the tube body on the water permeable plate, and configured to be freely fitted on the upper vertical pipe, and the tube body and the filter are configured to be capable of being taken out from the fixed pipe by pulling up the movable pipe together with the rainwater guide pipe along the upper vertical pipe and to be capable of being contained in the fixed pipe.

3. The rainwater filtering device for an inflow path according to claim 2, wherein the water permeable tube body is formed of a porous material, a perforated member, a hard net, or a slit member.

4. The rainwater filtering device for an inflow path according to claim 2, wherein the filter is formed into a cylindrical shape, and a lower end of the filter is closed by a lower band in an openable manner.

5. The rainwater filtering device for an inflow path according to claim 1,
wherein the inflow path has: a horizontal pipe that is extended in the horizontal direction and buried in the ground; a bottomed upper inlet that is buried to expose an upper end thereof on the ground surface and has the horizontal pipe connected thereto; and the vertical member comprises a cylindrical vertical inlet that has an upper part connected to a bottom portion of the upper inlet and allows the rainwater supplied from the horizontal pipe to flow down from an upper end opening portion and to be thereby fed to the rainwater containing section,
the mounting and dismounting member has: a plate which is secured to one of an intermediate inner surface and a lower end of the vertical inlet and on which the tube body is placed; a ring-like receiving member secured to an inner surface of the vertical inlet so as to be placed above the upper end of the tube body placed on the plate; and the rainwater guide comprising a cylindrical rainwater guide member that has an upper end placed on the receiving member and a lower end movably inserted into the upper part of the tube body, and an inside diameter of the receiving member is formed to be larger than an outside diameter of the tube body, and the tube body and the filter are configured to be capable of being taken out from the vertical inlet by removing the rainwater guide member from the vertical inlet and to be capable of being contained in the vertical inlet.

6. The rainwater filtering device for an inflow path according to claim 5, wherein the water permeable tube body is formed of a porous material, a perforated member, a hard net, or a slit member.

7. The rainwater filtering device for an inflow path according to claim 5, wherein the filter is formed into a cylindrical shape, and a lower end of the filter is closed by a lower band in an openable manner.

8. The rainwater filtering device for an inflow path according to claim 5, wherein the plate is one of a water permeable plate and a bottom plate.

9. The rainwater filtering device for an inflow path according to claim 1, wherein the water permeable tube body is formed of a porous material, a perforated member, a hard net, or a slit member.

10. The rainwater filtering device for an inflow path according to claim 1, wherein the filter is formed into a cylindrical shape, and a lower end of the filter is closed by a lower band in an openable manner.

11. The rainwater filtering device for an inflow path according to claim 1, wherein the filter is contained in the tube body.

* * * * *